US012657705B2

(12) United States Patent
Shen et al.

(10) Patent No.: US 12,657,705 B2
(45) Date of Patent: Jun. 16, 2026

(54) METHODS AND SYSTEMS FOR IMAGE QUALITY ASSESSMENT

(71) Applicant: ZHEJIANG HERYMED TECHNOLOGY CO., LTD., Hangzhou (CN)

(72) Inventors: Cheng Shen, Hangzhou (CN); Chaohui Jin, Hangzhou (CN); Ming Chen, Hangzhou (CN); Huogen Wang, Hangzhou (CN)

(73) Assignee: ZHEJIANG HERYMED TECHNOLOGY CO., LTD., Hangzhou (CN)

( * ) Notice: Subject to any disclaimer, the term of this patent is extended or adjusted under 35 U.S.C. 154(b) by 433 days.

(21) Appl. No.: 18/327,872

(22) Filed: Jun. 1, 2023

(65) Prior Publication Data

US 2024/0005494 A1 Jan. 4, 2024

(30) Foreign Application Priority Data

Jul. 1, 2022 (CN) .......................... 202210763289.7

(51) Int. Cl.
G06T 7/00 (2017.01)
G06T 7/11 (2017.01)

(52) U.S. Cl.
CPC .............. G06T 7/0012 (2013.01); G06T 7/11 (2017.01); *G06T 2207/10016* (2013.01);
(Continued)

(58) Field of Classification Search
CPC .................... G06T 7/0012; G06T 7/11; G06T 2207/10016; G06T 2207/10068;
(Continued)

(56) References Cited

U.S. PATENT DOCUMENTS

| | | | |
|---|---|---|---|
| 2021/0225003 A1 | 7/2021 | Wang | |
| 2022/0012915 A1* | 1/2022 | He | H04N 23/73 |
| 2022/0202275 A1 | 6/2022 | Xiao et al. | |

FOREIGN PATENT DOCUMENTS

| | | |
|---|---|---|
| CN | 100505895 C | 6/2009 |
| CN | 101625759 B | 10/2011 |

(Continued)

OTHER PUBLICATIONS

Liu, Xin, Research on Medical Image Segmentation Based on U-Net Network, Chinese Excellent Master's Dissertation Full-text Database Medical and Health Science and Technology Series, 2022, 11 pages.

(Continued)

*Primary Examiner* — Molly Wilburn
(74) *Attorney, Agent, or Firm* — METIS IP LLC

(57) ABSTRACT

Embodiments of the present disclosure provides a method and a system for image quality assessment. The method may include obtaining a first image of a target video, wherein the first image may be determined based on a target video frame in the target video; and determining a target image quality of the target video frame based on at least one of a first parameter and a second parameter of the first image, wherein, the first parameter may be determined based on an effective region in the first image, the second parameter may be determined based on a first similarity parameter between the first image and a second image, and the second image may be determined based on a video frame other than the target video frame in the target video.

18 Claims, 7 Drawing Sheets

(52) U.S. Cl.
    CPC .............. *G06T 2207/10068* (2013.01); *G06T 2207/20021* (2013.01); *G06T 2207/20081* (2013.01); *G06T 2207/20221* (2013.01); *G06T 2207/30168* (2013.01)

(58) Field of Classification Search
    CPC . G06T 2207/20021; G06T 2207/20081; G06T 2207/20221; G06T 2207/30168; G06T 2207/20084; G06T 2207/30092; G06T 7/187; G06T 7/0002; G06V 10/25; G06V 10/26; G06V 10/454; G06V 10/82; G06V 2201/03
    See application file for complete search history.

(56)                    References Cited

FOREIGN PATENT DOCUMENTS

| | | |
|---|---|---|
| CN | 102421008 A | 4/2012 |
| CN | 101930607 B | 9/2012 |
| CN | 102883180 B | 8/2014 |
| CN | 104914723 A | 9/2015 |
| CN | 106650816 A | 5/2017 |
| CN | 105721863 B | 11/2017 |
| CN | 109801256 A | 5/2019 |
| CN | 110996096 A | 4/2020 |
| CN | 111145206 A | 5/2020 |
| CN | 111161212 A | 5/2020 |
| CN | 110738658 B | 9/2020 |
| CN | 111739007 A | 10/2020 |
| CN | 112418289 A | 2/2021 |
| CN | 112465763 A | 3/2021 |
| CN | 112597981 A | 4/2021 |
| CN | 112611754 A | 4/2021 |
| CN | 112750121 A | 5/2021 |
| CN | 113012140 A | 6/2021 |
| CN | 113116390 A | 7/2021 |
| CN | 114359183 A | 4/2022 |
| CN | 114419008 A | 4/2022 |
| CN | 114419521 A | 4/2022 |

OTHER PUBLICATIONS

Shi, Xiaoyu, Image Quality Assessment Based on SIFT Feature and Structural Similarity, Chinese Excellent Master's Dissertation Full-text Database Information Science and Technology Series, 2013, 64 pages.

Sharib Ali et al., A Deep Learning Framework for Quality Assessment and Restoration in Video Endoscopy, Medical Image Analysis, 68: 1-25, 2021.

Sun, Huakui, Research on Digital Image Processing and Recognition Technology, Tianjin Science and Technology Press, 2019, 7 pages.

Yu, Shunzhang et al., Epidemiology and Computer Application, Fudan University Press, 2011, 7 pages.

First Office Action in Chinese Application No. 202210763289.7 mailed on Aug. 18, 2022, 28 pages.

The Second Office Action in Chinese Application No. 202210763289.7 mailed on Sep. 22, 2022, 28 pages.

* cited by examiner

300

310

Obtaining, by the image acquisition module 210, a first image of a target video

320

Determining, by the image quality determination module 220, a target image quality of the target video frame based on a first parameter and/or a second parameter of the first image <u>500</u>

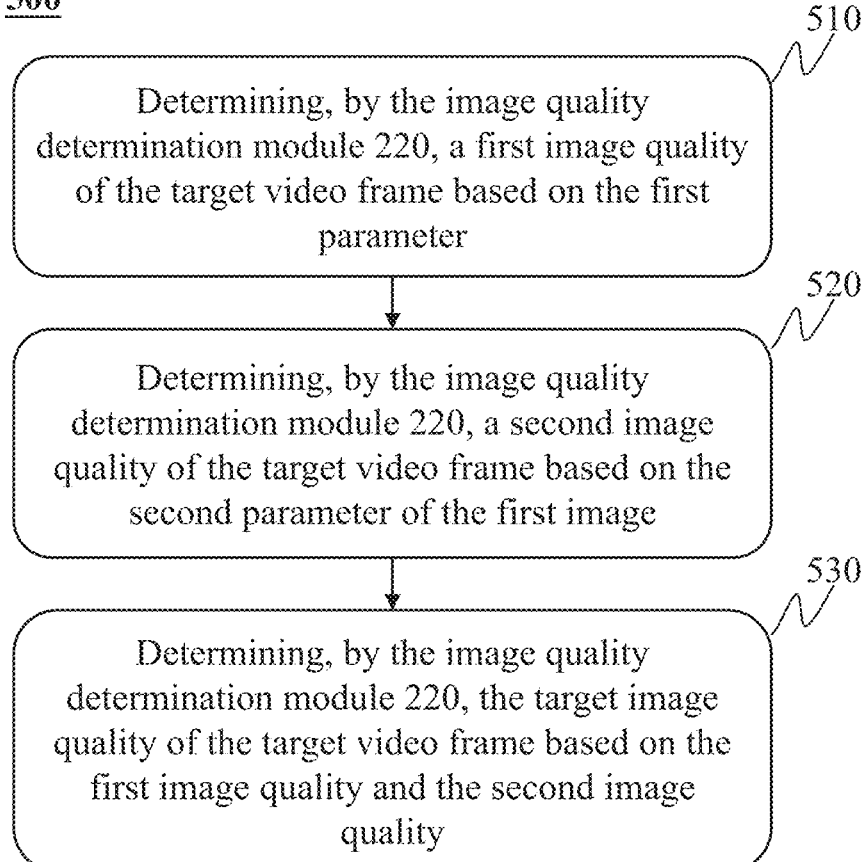

510

Determining, by the image quality determination module 220, a first image quality of the target video frame based on the first parameter

520

Determining, by the image quality determination module 220, a second image quality of the target video frame based on the second parameter of the first image

530

Determining, by the image quality determination module 220, the target image quality of the target video frame based on the first image quality and the second image quality

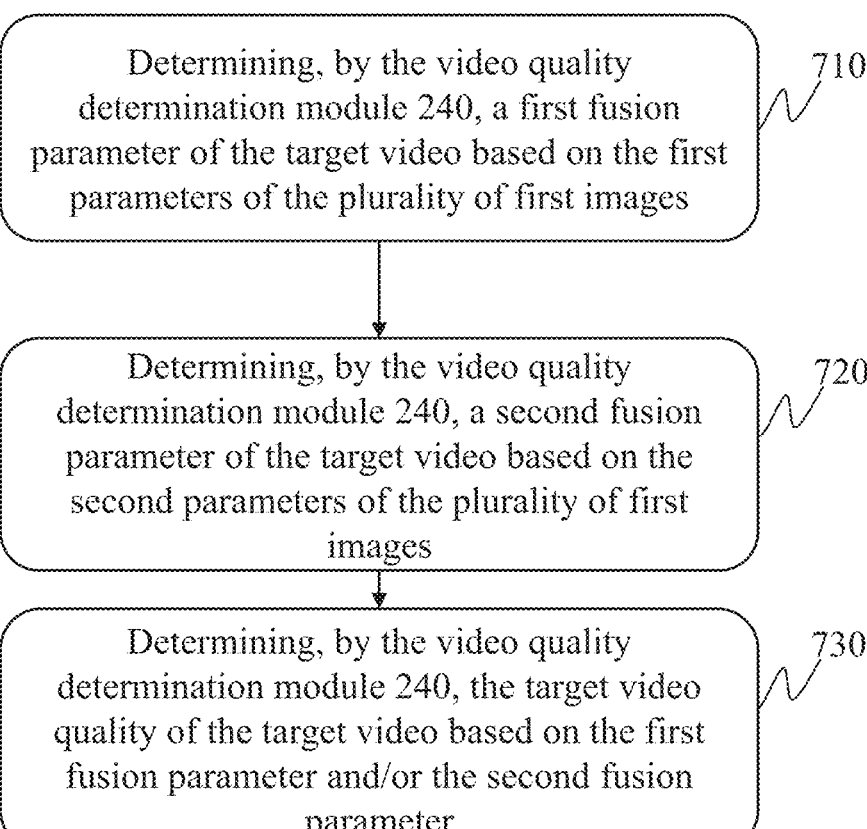

Determining, by the video quality determination module 240, a first fusion parameter of the target video based on the first parameters of the plurality of first images    710

Determining, by the video quality determination module 240, a second fusion parameter of the target video based on the second parameters of the plurality of first images    720

Determining, by the video quality determination module 240, the target video quality of the target video based on the first fusion parameter and/or the second fusion parameter    730

FIG. 7

METHODS AND SYSTEMS FOR IMAGE QUALITY ASSESSMENT

CROSS-REFERENCE TO RELATED APPLICATIONS

This application claims priority to Chinese Patent Application No. 202210763289.7, filed on Jul. 1, 2022, the contents of each of which are incorporated herein by reference in their entirety.

TECHNICAL FIELD

The present disclosure relates to the field of image quality assessment, in particular, to a method and a system for image quality assessment.

BACKGROUND

With the continuous development of the medical technology, the endoscope gradually becomes an important means to assist doctors in disease diagnosis. The doctors can insert an endoscope into a stomach through the mouth or into the body through other natural channels, and obtain image and/or video information of relevant organs by the endoscope. In a medical endoscopic surgery, the image quality of the endoscopic image may be assessed to determine whether the cleanliness of the relevant organs before surgery or the doctor's operation meets the standard. However, the existing techniques for image and/or video quality assessment generally focus on the factors such as a peak signal-to-noise ratio, an edge structure, and a sharpness of an image, and are not be suitable for the image quality assessment of the endoscopic image.

Therefore, it is desirable to provide a method for image quality assessment, which can determine the image quality of the endoscopic image, thereby assessing whether the preoperative preparation is well performed or whether the doctor's operation meets the standard in the medical endoscopic surgery.

SUMMARY

One aspect of the present disclosure provides a method for image quality assessment. The method for image quality assessment may include obtaining a first image of a target video. The first image may be determined based on a target video frame in the target video. The method may also include determining a target image quality of the target video frame based on at least one of a first parameter and a second parameter of the first image. The first parameter may be determined based on an effective region in the first image, the second parameter may be determined based on a first similarity parameter between the first image and a second image, and the second image may be determined based on a video frame other than the target video frame in the target video.

Another aspect of the present disclosure provides a system for image quality assessment. The system may include an image acquisition module configured to obtain a first image of a target video. The first image may be determined based on a target video frame in the target video. The system may also include an image quality determination module configured to determine a target image quality of the target video frame based on at least one of a first parameter and a second parameter of the first image. The first parameter may be determined based on an effective region in the first image, the second parameter may be determined based on a first similarity parameter between the first image and a second image, and the second image may be determined based on a video frame other than the target video frame in the target video.

Another aspect of the present disclosure provides a computer-readable storage medium. The storage medium may store computer instructions. When a computer reads the computer instructions in the storage medium, the computer may execute the following method. The method may include obtaining a first image of a target video. The first image may be determined based on a target video frame in the target video. The method may also include determining a target image quality of the target video frame based on at least one of a first parameter and a second parameter of the first image. The first parameter may be determined based on an effective region in the first image, the second parameter may be determined based on a first similarity parameter between the first image and a second image, and the second image may be determined based on a video frame other than the target video frame in the target video.

BRIEF DESCRIPTION OF THE DRAWINGS

The present disclosure is further illustrated in terms of exemplary embodiments, and these exemplary embodiments are described in detail with reference to the drawings. These embodiments are not limited. In these embodiments, the same numeral indicates the same structure, wherein:

FIG. 5 is another flowchart illustrating an exemplary process for image quality assessment according to some embodiments of the present disclosure;

FIG. 7 is a flowchart illustrating an exemplary process of determining a target video quality of a target video according to some embodiments of the present disclosure.

DETAILED DESCRIPTION

Figure 1:
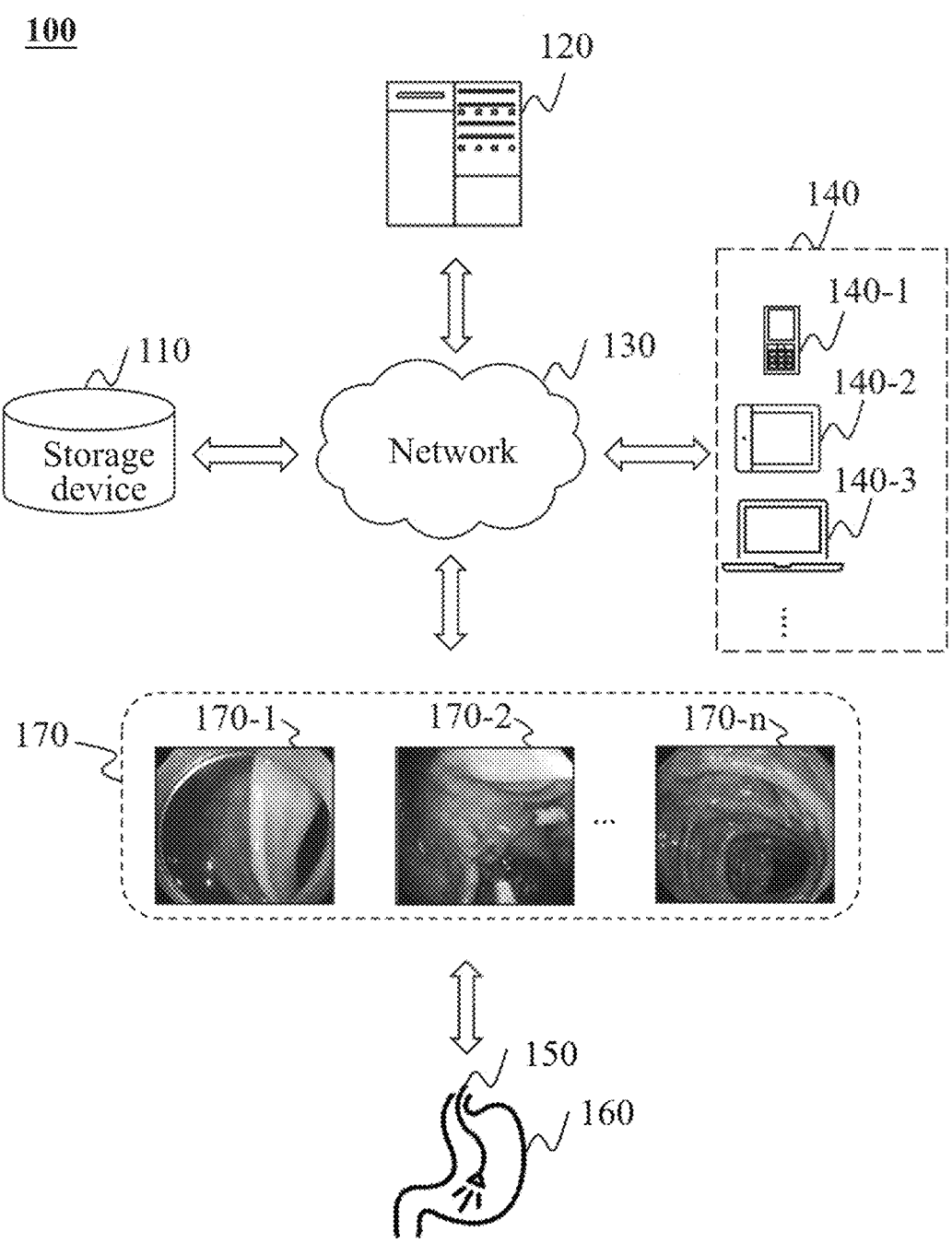
FIG. 1 is a schematic diagram illustrating an exemplary application scenario of a system for image quality assessment according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

FIG. 1 is a schematic diagram illustrating an exemplary application scenario of a system for image quality assessment according to some embodiments of the present disclosure.

As shown in FIG. 1, the application scenario 100 of the system for image quality assessment may include a storage device 110, a processor 120, a network 130, a user terminal 140, an endoscope 150, a target organ 160, and a target video 170.

The storage device 110 may be configured to store data, instructions, and/or any other information related to the system for image quality assessment. In some embodiments, the storage device 110 may store data and/or information that is obtained from other components (e.g., the processor 120, the user terminal 140, the endoscope 150, etc.) in the application scenario 100. For example, the storage device 110 may store image data (e. g., the target video 170) that is obtained via the endoscope 150. In some embodiments, the storage device 110 may be provided in the processor 120. In some embodiments, the storage device 110 may include a mass memory, a removable memory, or any combination thereof.

The processor 120 may process data and/or information related to the system for image quality assessment. In some embodiments, the processor 120 may access the storage device 110, the user terminal 140, and/or the endoscope 150 to obtain information and/or data. For example, the processor 120 may acquire image data, video data, etc., from the storage device 110 and/or the endoscope 150. As another example, the processor 120 may obtain user instruction information from the user terminal 140. In some embodiments, the processor 120 may process the acquired information and/or data. For example, the processor 120 may determine a first image of a target video based on a target video frame in the target video, and the processor 120 may determine a second image based on a video frame other than the target video frame in the target video. More information about the target video frame and the video frame other than the target video frame may be found elsewhere in the present disclosure, for example, FIG. 3 and the related descriptions. As another example, the processor 120 may determine a target image quality of the target video frame based on a first parameter and/or a second parameter of the first image, wherein the first parameter may be determined by the processor 120 based on an effective region in the first image, and the second parameter may be determined by the processor 120 based on a first similarity parameter of the first image and the second image. More information about the above examples may be found elsewhere in the present disclosure, for example, FIG. 3 and the related descriptions. In some embodiments, the processor 120 may include one or more processing engines (e.g., a single-chip processing engine or a multi-chip processing engine). Merely by way of example, the processor 120 may include a central processing unit (CPU). The processor 120 may process data, information and/or a processing result that are obtained from other devices or components of the system, and execute program instructions based on the data, information and/or the processing result to perform one or more functions described in the present disclosure.

The network 130 may include any network capable of providing information and/or data exchange for various components in the application scenario 100. One or more components (e.g., the storage device 110, the processor 120, the user terminal 140, the endoscope 150, etc.) in the application scenario 100 of the system for image quality assessment may exchange information and/or data via the network 130. For example, the network 130 may send image data in the storage device 110 to the processor 120. In some embodiments, the network 130 may be any one or more of wired networks or wireless networks. In some embodiments, the network 130 may include one or more network access points. For example, the network 130 may include wired or wireless network access points. In some embodiments, the network may be a variety of topologies, such as a point-to-point topology, a shared topology, a centralized topology, or a combination of various topologies.

The user terminal 140 may refer to one or more terminal devices or software used by a user. The user may refer to an operator, for example, a doctor, of the endoscope 150. The user terminal 140 may include, but not limited to, a mobile phone 140-1, a tablet computer 140-2, a notebook computer 140-3, or the like. The user may input instruction(s) and/or information via the user terminal 140. The user terminal 140 may display data and/or information to the user. For example, a result of image quality assessment of the first image may be displayed to the user.

The endoscope 150 may be configured to assist medical detection or surgical operation. The endoscope 150 may include, but not limited to, a laparoscopy, a gastroscope, a laryngoscope, or the like. The endoscope 150 may obtain video data of internal organs of an organism. For example, the video data of a target organ may be obtained via the gastroscope. The endoscope 150 may acquire the target video 170 and send the target video 170 to other components (e.g., the storage device 110, the processor 120, the user terminal 140, etc.) of the application scenario 100 via the network 130.

The target organ 160 may refer to an organ in the organism that needs to be captured. The target organs 160 may include, but not limited to, a stomach, a pancreas, an esophagus, or the like. The user may capture the target organ 160 via the endoscope 150 to obtain the target video 170.

The target video 170 may refer to video data of the organ(s) in the organism that is obtained via the endoscope 150. For example, the video data may include video(s) of an inner wall of the stomach, an inner wall of an intestine, an inner wall of the uterus, or the like. The target video 170 may include a plurality of video frames, such as video frames 170-1, 170-2, . . . , 170-n, or the like.

It should be noted that the application scenario 100 of the system for image quality assessment may be provided for the purpose of illustration, and may not be intended to limit the scope of the present disclosure. For those skilled in the art, many modifications or changes may be made according to the description of the present disclosure. For example, the application scenario of the system for image quality assessment may also include a database. For another example, the application scenario 100 of the system for image quality assessment may be implemented on other devices to achieve similar or different functions. However, changes and modifications may not deviate from the scope of the present disclosure.

Figure 2:
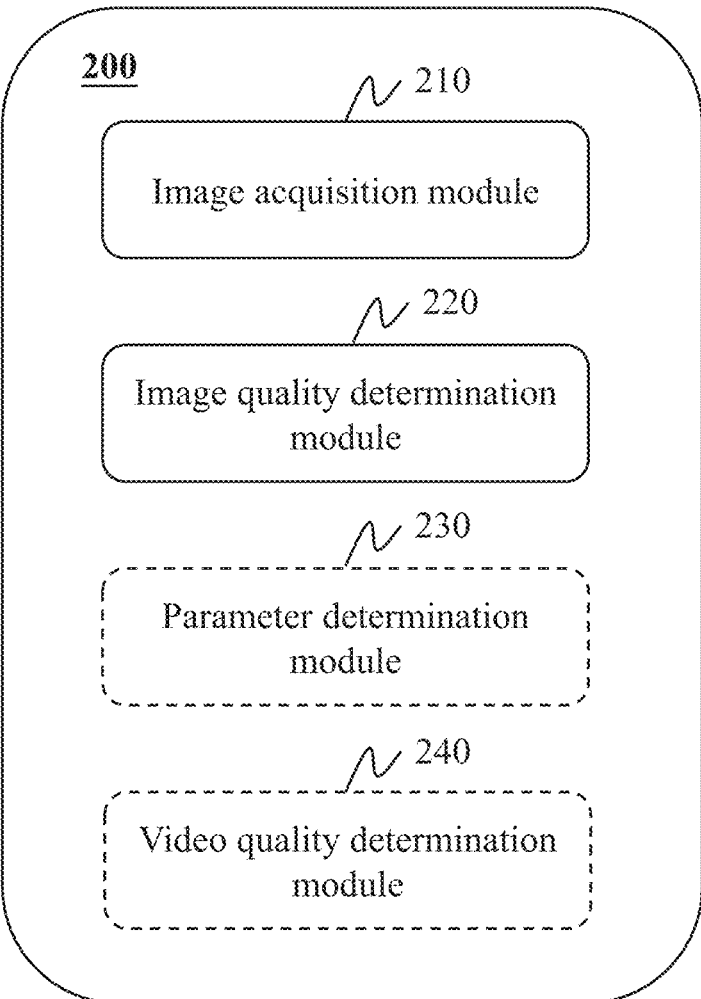
FIG. 2 is a block diagram illustrating an exemplary system for image quality assessment according to some embodiments of the present disclosure.

FIG. 2 is a block diagram illustrating an exemplary system for image quality assessment according to some embodiments of the present disclosure.

In some embodiments, the system 200 for image quality assessment may include an image acquisition module 210 and an image quality determination module 220.

The image acquisition module 210 may be configured to obtain a first image of a target video. The first image may be determined based on a target video frame in the target video.

The image quality determination module 220 may be configured to determine a target image quality of the target video frame based on a first parameter and/or a second parameter of the first image. The first parameter may be determined based on an effective region in the first image, the second parameter may be determined based on a first similarity parameter between the first image and a second image, and the second image may be determined based on a video frame other than the target video frame in the target video. In some embodiments, the image quality determination module 220 may further be configured to determine a first image quality of the target video frame based on the first parameter, determine a second image quality of the target video frame based on the second parameter of the first image, and determine the target image quality of the target video frame based on the first image quality and the second image quality.

In some embodiments, the system 200 may further include a parameter determination module 230. The parameter determination module 230 may be configured to determine the first parameter. In some embodiments, the parameter determination module 230 may be further configured to process the first image based on an effective score model to obtain target effective score information corresponding to the first image. The target effective score information may represent score information of each pixel in the first image as belonging to the effective region, and the effective score model may include a machine learning model. The first parameter may be determined based on the target effective score information. In some embodiments, the parameter determination module 230 may also be further configured to segment the first image based on a segmentation model to generate a segmented image with a target mask. A region corresponding to the target mask in the segmented image may be an ineffective region in the first image, and the segmentation model may include a machine learning model. The first parameter may be determined based on the segmented image with the target mask. In some embodiments, the parameter determination module 230 may also be configured to obtain a plurality of groups of segmentation training samples. The segmentation training samples may include sample images with segmentation labels, and segmentation labels may be sample segmented images obtained by marking ineffective regions in the sample images using a first mask. The parameter determination module 230 may further be configured to obtain a trained segmentation model by performing a plurality of rounds of training on an initial segmentation model based on the plurality of segmentation training samples. After performing each preset count of rounds of training on the initial segmentation model, for each group of segmentation training samples, the parameter determination module 230 may obtain an initial segmented image with a second mask by inputting the group of segmentation training samples into the initial segmentation model that is trained after the preset count of rounds of training; determine a second similarity parameter between the first mask and the second mask; and in response to the second similarity parameter satisfies a preset replacement condition, in a next preset count of rounds of training, replace a segmentation label of the group of segmented training samples with the initial segmented image with the second mask.

In some embodiments, the system 200 may also include a video quality determination module 240. The video quality determination module 240 may be configured to determine a target video quality of the target video based on first parameters and/or second parameters of a plurality of first images in the target video. In some embodiments, the video quality determination module 240 may be further configured to determine a first fusion parameter of the target video based on the first parameters of the plurality of first images, determine a second fusion parameter of the target video based on the second parameters of the plurality of first images, and determine the target video quality of the target video based on the first fusion parameter and/or the second fusion parameter.

Figure 3:
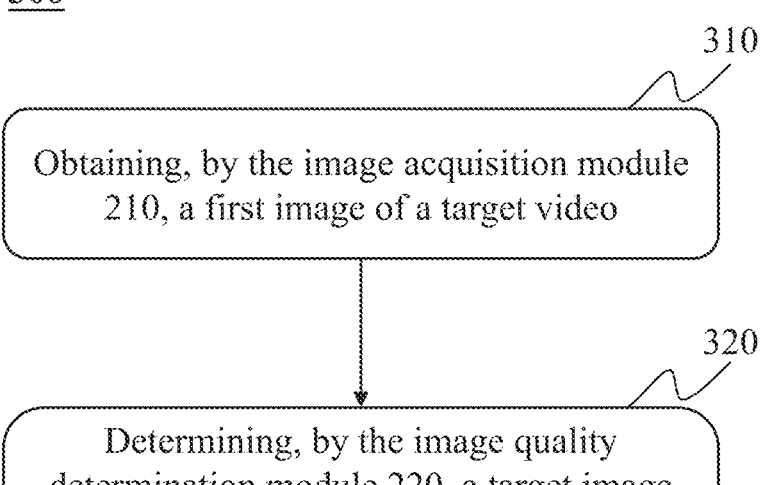
FIG. 3 is a flowchart illustrating an exemplary process for image quality assessment according to some embodiments of the present disclosure.

More descriptions of modules of the system 200 may be found elsewhere in the present disclosure, for example, FIG. 3, FIG. 4, and the relevant descriptions.

It should be understood that the system and modules shown in FIG. 2 may be implemented in various ways.

It should be noted that the above descriptions of the system for image quality assessment and modules are merely for the convenience of description, and are not intended to limit the scope of the embodiments in the present disclosure. It can be understood that for those skilled in the art, after understanding the principle of the system, various modules may be arbitrarily combined, or a subsystem may be formed to connect with other modules without departing from this principle. In some embodiments, the image acquisition module 210, the image quality determination module 220, and the parameter determination module 230 disclosed in FIG. 2 may be different modules in a system, or may be one module that can realize the functions of two or more of the above modules. For example, each module may share one storage module, or each module may also have its own storage module. Such deformation is within the scope of the present disclosure.

FIG. 3 is a flowchart illustrating an exemplary process for image quality assessment according to some embodiments of the present disclosure. In some embodiments, process 300 may be performed by the processor 120. As shown in FIG. 3, the process 300 may include following operations.

In 310, the image acquisition module 210 may obtain a first image of a target video.

The target video may refer to a video that needs a quality assessment. In some embodiments, the target video may be obtained based on an endoscope. The user may capture an organ of an organism to obtain the target video via the endoscope. For example, a stomach of a people may be captured via the endoscope to obtain the target video. In some embodiments, the target video may also be obtained by other ways. For example, the target video may be obtained by performing a B-scan ultrasonography on the organ of the organism.

The quality assessment may include, but not limited to, assessing whether the patient has not emptied the intestinal tract as required before an operation, resulting in the presence of certain feces, fecal water, bubbles, and other impurities in intestinal tract; assessing whether the camera is too close to the visceral wall due to the nonstandard operation of a doctor, resulting in blurred image; assessing whether the doctor operates too fast or shakes, resulting in motion blur on the whole; assessing whether the local light of the picture is too dark or overexposed due to the excessive occlusion of the organ caused by the camera angle is not in place.

In some embodiments, the quality assessment may include a video quality assessment of the target video. More information of the quality assessment of the target video may be found elsewhere in the present disclosure, for example, FIG. 7 and the related descriptions.

In some embodiments, the processor 120 may include image quality assessment of an image in the target video. When the quality of the image in the target video needs to be assessed, the image acquisition module 210 may obtain the first image of the target video. The first image may be an image that needs to be assessed for image quality. The first image may be determined based on a target video frame in the target video. The target video frame may be a video frame in the target video. The target video frame may be determined in various ways. For example, the image acquisition module 210 may determine all video frames in the target video as target video frames. As another example, the image acquisition module 210 may perform an image recognition on the target video, determine a video frame including the target organ 160, and determine the video frame including the target organ 160 as the target video frame. In some embodiments, the image acquisition module 210 may obtain the first image based on the target video frame. For example, the image acquisition module 210 may directly determine the target video frame as the first image. As another example, the image acquisition module 210 may also determine a local image (e.g., a local image including a target organ) in the target video frame as the first image. When the target video is a video that is obtained by capturing an organ of an organism via the endoscope, the first image may include an endoscopic image.

In 320, the image quality determination module 220 may determine a target image quality of the target video frame based on a first parameter and/or a second parameter of the first image.

The first parameter may refer to a parameter representing a validity of content in the first image. In some embodiments, the parameter determination module 230 may determine the first parameter based on an effective region in the first image.

The effective region may refer to a region where effective information in the first image is located. The effective information may refer to information that is conducive to identifying the content in the first image. When the first image is an endoscopic image, the effective region in the first image may be a region of the organ to be captured in the image. Correspondingly, the first image may also include an ineffective region, which may refer to a region where ineffective information in the first image is located. The ineffective information may refer to information that makes no sense or has a negative impact on the identification of the content in the first image. When the first image is an endoscopic image, the ineffective region in the first image may include the region where the feces, fecal water, bubbles and other impurities exist, and the feces, fecal water, bubbles and other impurities may be ineffective information. The ineffective region in the first image may also include the shadow, highlight, blur and other regions in the first image, and contents such as the shadow, highlight, and blur may be ineffective information.

In some embodiments, the first parameter may include a proportion of the effective region in the first image. The proportion of the effective region in the first image may be a proportion of the effective region in the first image. The parameter determination module 230 may determine the proportion of the effective region in the first image in a variety of ways.

In some embodiments, the parameter determination module 230 may segment the first image based on a segmentation model to generate a segmented image with a target mask. A region corresponding to the target mask in the segmented image may be an ineffective region in the first image, and the segmentation model may include a machine learning model. The parameter determination module 230 may input the first image into the segmentation model, and an output of the segmentation model may be the segmented image with the target mask. The segmented image may include, but not limited to, a binary image, a ternary image, or the like. For example, when the segmented image is a binary image, the target mask may be white region(s) in the segmented image, which may represent the ineffective region in the first image. Black region(s) in the segmented image may represent the effective region in the first image. As another example, when the segmented image is a ternary image, the target mask may be white region(s) and gray region(s) in the segmented image. The gray region(s) may represent area(s) where feces, fecal water, bubbles and other impurities exist in the first image. The white regions may represent region(s) where shadows, highlights, and blurs exist in the first image. Black region(s) in the segmented image may represent the effective region in the first image.

Figure 4A:
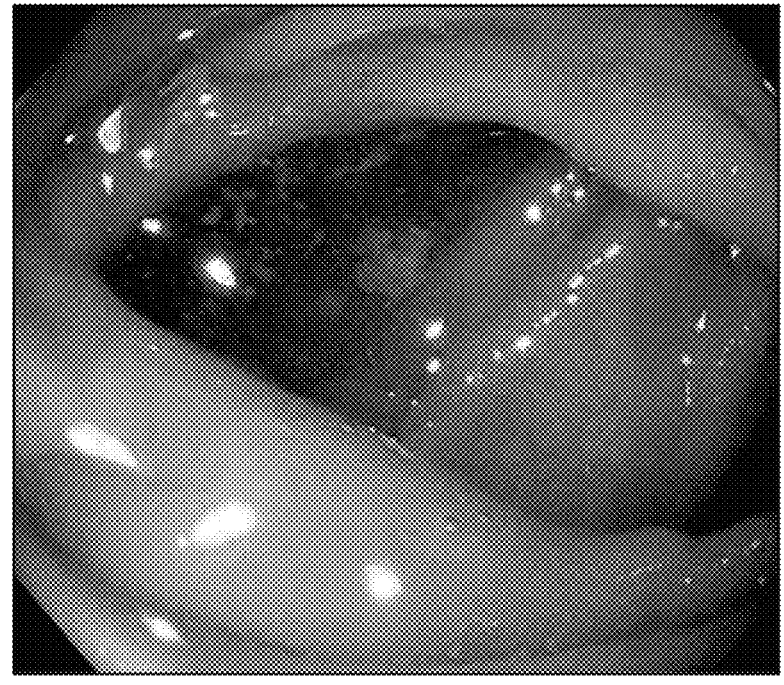
FIG. 4A is a schematic diagram illustrating an exemplary first image according to some embodiments of the present disclosure.
Figure 4B:
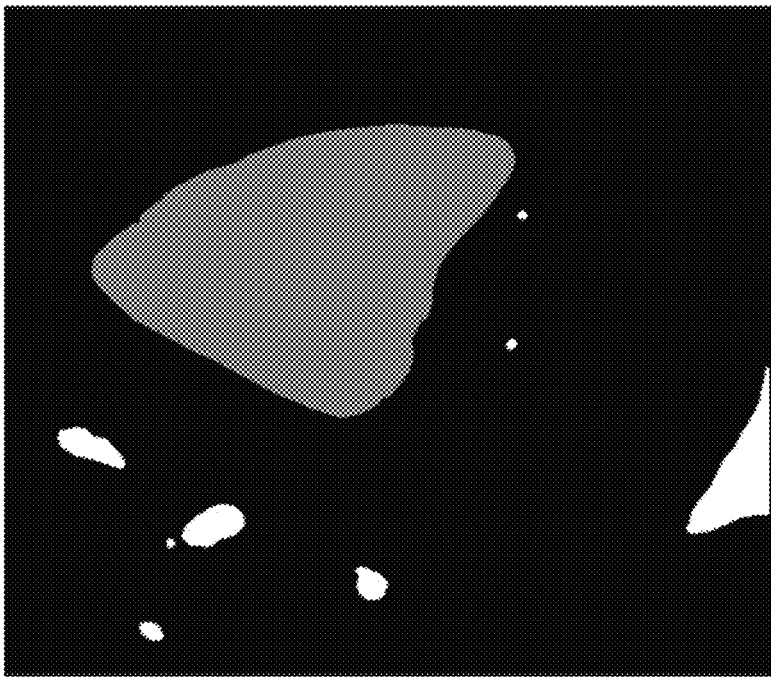
FIG. 4B is a schematic diagram illustrating an exemplary segmented image according to some embodiments of the present disclosure.

For example, the parameter determination module 230 may input the first image shown in FIG. 4A into the segmentation model, and the output of the segmentation model may be the segmented image with the target mask shown in FIG. 4B, wherein the target mask may include white regions and a gray region in FIG. 4B.

The segmentation model may be any one of various machine learning models that can realize the functions. For example, segmentation model may include, but not limited to, a convolutional neural network (CNN) model, a UNet++ model, or the like. The parameter determination module 230 may obtain the segmentation model based on training. More information of training the segmentation model may be found elsewhere in the present disclosure, for example, FIG. 6 and the related descriptions.

In some embodiments of the present disclosure, the ineffective region of the first image may be quickly and accurately determined by the segmentation model, thus reducing the cost of manual assessment and improving the accuracy of determination.

In some embodiments, the parameter determination module 230 may determine the effective region in the first image based on the segmented image with the target mask. The parameter determination module 230 may determine a region in the first image other than the ineffective region as the effective region. That is, the parameter determination module 230 may determine the region in the segmented image other than the target mask as the effective region.

In some embodiments, the image quality determination module 220 may obtain a total area of the first image, determine an area of the effective region based on the effective region in the first image, determine a proportion of the area of the effective region based on the total area and the area of the effective region. The total area may be determined based on a size of the first image.

In some embodiments, the parameter determination module 230 may also process the first image based on a parameter determination model to determine the first parameter of the first image. The first parameter may be the proportion of the effective region in the first image. The parameter determination model may include an image segmentation layer and a parameter determination layer. The parameter determination module 230 may segment the effective region and the ineffective region in the first image based on the image segmentation layer to obtain the segmented image with the target mask, and then process the segmented image with the target mask based on the parameter determination layer to determine the proportion of the effective region in the first image.

In some embodiments, a type of the image segmentation layer and a type of the segmentation model may be the same, and parameters of the image segmentation layer and the segmentation model may be different. For example, the types of image segmentation layer and segmentation model may both be convolutional neural network models, but a count of convolution cores and neurons in image segmentation layer may be less than a count of convolution cores and neurons in the segmentation model, so the accuracy of image segmentation layer may be lower than the accuracy of the segmentation model.

The parameter determination module 230 may obtain the parameter determination model based on training. A parameter training sample may include a sample image, and a parameter label may include one or more first sample parameters corresponding to the sample image. The first sample parameter may be a proportion of an effective region in the sample image. The parameter determination module 230 may process the sample image based on a trained segmentation model, generate a sample segmented image with a sample mask, and then determine the first sample parameter based on a proportion of the sample segmented image with the sample mask in the sample image. More information about how to obtain the trained segmentation model may be found elsewhere in the present disclosure, for example, FIG. 6 and the related descriptions. In some embodiments, the parameter determination module 230 may train an initial image segmentation layer and an initial parameter determination layer based on the sample image and the first sample parameter to obtain the trained parameter determination model. The parameter determination module 230 may input parameter training samples into the initial image segmentation layer, input an output of the initial image segmentation layer to the initial parameter determination layer, and construct a loss function based on an output of the initial parameter determination layer and the parameter label. The parameters of the initial image segmentation layer and the initial parameter determination layer may be iteratively updated based on the loss function. Until a preset condition is met, the training may be completed, and the trained parameter determination model may be obtained. The preset condition may include, but not be limited to, the loss function converging, a training period reaching a threshold, or the like.

In some embodiments of the present disclosure, although the accuracy of the image segmentation layer in the parameter determination model is lower than the accuracy of the segmentation model, a calculation amount of the image segmentation layer in determining the segmented image may be less than a calculation amount of the segmentation model in determining the segmented image, which may ensure that the efficiency of the image segmentation layer is higher than the efficiency of the segmentation model in determining the first parameter. At the same time, the parameter label of training parameter determination model may be generated by a high-precision segmentation model, which may not only ensure a count of parameter training samples, but also ensure the accuracy of the parameter label, and further ensure the accuracy of the trained parameter determination model.

In some embodiments, the first parameter may also include parameter information representing each pixel in the first image as an effective pixel. The effective pixel may be regarded as a pixel in the effective region, and an ineffective pixel may be regarded as a pixel in the ineffective region.

The parameter determination module 230 may also process the first image based on an effective score model to obtain target effective score information corresponding to the first image. The first parameter may be determined based on the target effective score information. The target effective score information may represent score information of each pixel in the first image as belonging to the effective region. For example, the target effective score information may be a probability that each pixel in the first image as belonging to the effective region.

In some embodiments, an input of the effective score model may be the first image, and an output of the effective score model may be the target effective score information corresponding to the first image. The effective score model may be a CNN model or any other machine learning model that can realize the functions.

The parameter determination module 230 may the obtain the effective score model by training. The parameter determination module 230 may obtain a plurality of groups of score training samples. A score training sample may include a sample image with a score label. The score label may be sample effective score information corresponding to the sample image. The sample effective score information may represent a probability that each pixel in the sample image as belonging to the effective region. The score label may be obtained by manually marking the sample image. The effective region and ineffective region in the sample image may be divided manually, and the probability that each pixel in the effective region of the sample image as belonging to the effective region may be labeled as "1", and the probability that each pixel in the ineffective region as belonging to the effective region may be labeled as "0". The parameter determination module 230 may input the score training sample into an initial effective score model, construct the loss function based on an output of the initial effective score model and the score label, and iteratively update parameters of the initial effective score model based on the loss function until a preset training condition is met, and obtain the trained effective score model. The preset training condition may include, but not limited to, the loss function converging, a training period reaching a threshold, or the like.

In some embodiments, the parameter determination module 230 may determine the first parameter based on the target effective score information. For example, if the target effective score value information of a pixel is greater than an effective score threshold, the pixel may be considered to be an effective pixel, otherwise, the pixel may be considered to be an ineffective pixel. The parameter determination module 230 may determine a proportion of effective pixels to all pixels in the first image or a count of effective pixels as the first parameter. As another example, the parameter determination module 230 may divide all pixels based on a plurality of preset effective score sub-threshold intervals to determine a count of pixels falling into each effective score sub-threshold interval. The parameter determination module 230 may calculate a weighted sum of the count of pixels falling into each effective sub-threshold interval based on a weight of each effective score sub-threshold interval. The parameter determination module 230 may determine a value of the weighted sum, or a proportion of the value of weighted sum to a value of the count of all pixels, as the first parameter.

In some embodiments, the first parameter may include at least one of a proportion of at least one effective sub-region in the first image, a count of the at least one effective sub-region, and a positional relationship of the at least one effective sub-region. The effective region includes at least one effective sub-region. Each effective sub-region of the at least one effective sub-region may be independent of other effective sub-region of the at least one effective sub-region and may not be connected with other effective sub-region of the at least one effective sub-region. The proportion of the at least one effective sub-region may refer to a proportion of each effective sub-region in the first image. The count of the at least one effective sub-region may refer to a total count of effective sub-regions in the first image. The positional relationship of the at least one effective sub-region may refer to a position of an effective sub-region in the first image. The parameter determination module 230 may analyze and process the segmented image with the target mask to determine the proportion, the count, and the positional relationship, of the at least one effective sub-region.

The second parameter may refer to a parameter representing a similarity of the first image and a second image. The second image may be determined based on a video frame other than the target video frame in the target video. For example, the video frame other than the target video frame may be any video frame other than the target video frame in the target video. In some embodiments, the video frame other than the target video frame may be an adjacent frame of the target video frame. Similar to the first image, the image acquisition module 210 may directly determine the video frame other than the target video frame as the second image, and may also determine the second image based on the video frame other than the target video frame in other ways. For example, similar to the determination of the first image based on the target video frame, the image acquisition module 210 may also determine a local image in the video frame other than the target video frame as the second image.

In some embodiments, the second parameter may be determined based on a first similarity parameter between the first image and the second image. The first similarity parameter may be a parameter for assessing a similarity between the first image and the second image. In some embodiments, the first similarity parameter may include a structural similarity (SSIM) between the first image and the second image. In some embodiments, the first similarity parameter may also include other parameters to assess the similarity between images. For example, the parameter determination module 230 may use the first image as a template, set a matching window, and determine the similarity between the first image and the second image by a square difference matching manner and/or a correlation matching manner, to determine the second parameter.

In some embodiments, the parameter determination module 230 may determine the first similarity parameter between the first image and the second image, and determine the first similarity parameter as the second parameter. For example, the parameter determination module 230 may determine the SSIM of the first image and the second image by comparing brightness, contrasts and structures of the first image and the second image, and determine the SSIM as the second parameter corresponding to the first image. When determining the SSIM between the first image and the second image, the parameter determination module 230 may take an average gray level of the first image or the second image as a measure of brightness, a standard deviation of gray level of the first image or the second image as a measure of contrast, and a covariance of the first image or the second image as a measure of SSIM. The SSIM between the first image and the second image may be determined by the following formulas:

$$L(x, y) = \frac{2\mu_x\mu_y + C_1}{\mu_x^2 + \mu_y^2 + C_1}, \tag{1}$$

$$C(x, y) = \frac{2\sigma_x\sigma_y + C_2}{\sigma_x^2 + \sigma_y^2 + C_2}, \tag{2}$$

$$S(x, y) = \frac{\sigma_{xy} + C_3}{\sigma_x\sigma_y + C_3}, \tag{3}$$

$$SSIM(x, y) = L(x, y) * C(x, y) * S(x, y), \tag{4}$$

where $SSIM(x,y)$ is the structural similarity between the first image and the second image, $L(x,y)$, $C(x,y)$ and $S(x,y)$ are the brightness contrast function, gray level contrast function, and structure contrast function of the first image and the second image, respectively. $\mu_x$ and $\mu_y$ represents an average value of gray levels of the first image and the second image, respectively. $\sigma_x$ and $\sigma_y$ represents the standard deviation of gray levels of the first image and the second image, respectively.

$$\sigma_x^2 \text{ and } \sigma_y^2$$

represents the variance of the first image and the second image, respectively. $\sigma_{xy}$ represents the covariance of the first image and the second image.

$$\mu_x, \mu_y, \sigma_x, \sigma_y, \sigma_x^2, \sigma_y^2, \text{ and } \sigma_{xy}$$

may be obtained by calculating the gray levels of the first image and the second image. $C_1$, $C_2$ and $C_3$ are preset constants to avoid the denominator in the formula being 0. For example, $C_1 = (K_1L)^2$, $C_2 = (K_2L)^2$, $$C_3 = \frac{C_2}{2},$$

$K_1 = 0.01$, $K_2 = 0.03$, and L is a dynamic range of pixel values of an image, which may generally be taken as 255. When $$C_3 = \frac{C_2}{2},$$

the formula (4) may be shortened as:

$$SSIM(x, y) = \frac{(2\mu_x\mu_y + C_1)(2\sigma_{xy} + C_2)}{\left(\mu_x^2 + \mu_y^2 + C_1\right)\left(\sigma_x^2 + \sigma_y^2 + C_2\right)}. \qquad (5)$$

The structural similarity between the first image and the second image may be a constant in a range of [0,1]. The larger the value of the structural similarity is, the smaller the image distortion is, and the more similar the first image and the second image are.

In some embodiments, the parameter determination module 230 may also obtain weights corresponding to the brightness comparison, gray level comparison, and structure comparison, between the first image and the second image, thereby determining the structural similarity between the first image and the second image. In some embodiments, the structural similarity between the first image and the second image may also be determined by the following formula:

$$SSIM(x, y) = [L(x, y)]^\alpha * [C(x, y)]^\beta * [S(x, y)]^\gamma, \qquad (6)$$

where $\alpha,\beta,\gamma$ represent weights corresponding to the brightness comparison, the gray level comparison, and the structure comparison between the first image and the second image, respectively. $\alpha,\beta,\gamma$ may be determined based on actual need(s) of a user, and $\alpha,\beta,\gamma$ may be greater than 0. For example, when the user regarded that weights corresponding to the brightness comparison, the gray level comparison, and the structure comparison between the first image and the second image as the same important, $\alpha,\beta,\gamma$ may all be set as 1. If the user pay more attention to the structure comparison between the first image and the second image, $\gamma$ may be set as 2, $\alpha$ and $\beta$ may be set as 1.

In some embodiments, the parameter determination module 230 may also determine the effective regions in the first image and the second image, determine the structural similarity between the effective regions in the first image and the second image, and determine the structural similarity between the effective regions in the first image and the second image as the second parameter. More information of determining the effective regions in the first image and the second image may be found elsewhere in the present disclosure.

In some embodiments in the present disclosure, the similarity between the effective regions of the images may be determined by determining the effective regions of the images. Not only the similarity of the images, but also the useful and effective information for the user may be considered, which make the assessment of the image quality more accurate, and avoid that even the similarity between images are large, it is not conductive to the user's recognition of the image content and results in the misjudgment of the image quality, which is caused by excessive ineffective information of the images.

In some embodiments, the parameter determination module 230 may also determine a plurality of groups of sub-image pairs in the first image and the second image after segmenting the first image and the second image based on a preset sliding window. For example, the preset sliding window may be 10*10 px, and a sliding unit of the sliding window may be 5 px each time. When the first image and the second image are both 20*10 px, the sliding window may slide three times, and three groups of sub-image pairs corresponding to the first image and the second image may be obtained after sliding. For one group of the plurality of sub-image pairs, the sub-image pair may include a first sub-image of the first image and a second sub-image corresponding to a position of the first sub-image in the second image. The first sub-image and the second sub-image may be local images obtained after the first image and the second image are segmented by the sliding window.

In some embodiments, the parameter determination module 230 may obtain a plurality of first sub-similarity parameters of the plurality of sub-image pairs, and the plurality of first sub-similarity parameters correspond to the plurality sub-image pairs one by one. The first sub-similarity parameter may refer to a parameter that represents a similarity between the first sub-image and the second sub-image of a corresponding position. For example, the parameter determination module 230 may determine a structural similarity between the first sub-image and the second sub-image in a sub-image pair, and determine the structural similarity as the first sub-similarity parameter of the sub-image pair.

In some embodiments, the parameter determination module 230 may determine the first similarity parameter based on the plurality of first sub-similarity parameters. For example, the parameter determination module 230 may determine an average first sub-similarity parameter of the plurality of sub-image pairs based on the plurality of first sub-similarity parameters of the plurality of sub-image pairs, and determine the average first sub-similarity parameter as the first similarity parameter corresponding to the first image.

The target image quality may refer to an image quality of the first image. It should be understood that the quality of an endoscopic surgery depends on the standardization of preoperative operation preparation and the standardization of doctor's operation. Therefore, when the first image is an endoscopic image, the image quality of the endoscopic image may be assessed to determine whether the preoperative preparation for endoscopic surgery is well performed, and whether the doctor's operation is standardized. The target image quality may be expressed in various ways. For example, the target image quality may be represented by a score from 0 to 100. The higher the score of the first image is, the better the image quality of the first image is, and the more the preoperative preparation for endoscopic surgery has been done and the more standardized the doctor's operation is. As another example, the target image quality may also be expressed by a grade of I-V. The higher the grade of the first image is, the better the image quality of the first image is, and the more the preoperative preparation for endoscopic surgery has been done and the more standardized the doctor's operation is.

In some embodiments, the image quality determination module 220 may determine the target image quality of the target video frame based on the first parameter of the first image. The image quality determination module 220 may analyze and process the first parameter of the first image to determine a first image quality of the target video frame; and determine, based on the first image quality, the target image quality of the target video frame. The first image quality may refer to an image quality determined after the image content of the target video frame is assessed. More information of determining the first image quality may be found elsewhere in the present disclosure, for example, FIG. 5 and the related descriptions. For example, the image quality determination module 220 may directly determine the first image quality as the target image quality of the target video frame.

In some embodiments, the image quality determination module 220 may also determine the target image quality of the target video frame based on the second parameter of the first image. The image quality determination module 220 may analyze and process the second parameter of the first image to determine a second image quality of the target video frame; and determine, based on the second image quality, the target image quality of the target video frame. The second image quality may refer to an image quality determined after a distortion between the target video frame and the video frame other than the target video frame in the target video is assessed. More information of determining the second image quality may be found elsewhere in the present disclosure, for example, FIG. 5 and the related descriptions. For example, the image quality determination module 220 may directly determine the second image quality as the target image quality of the target video frame.

In some embodiments, the image quality determination module 220 may also determine the target image quality of the target video frame based on the first image quality and the second image quality. More information about the above embodiments may be found elsewhere in the present disclosure, for example, FIG. 5 and the related descriptions.

In some embodiments of the present disclosure, the target image quality of the target video frame may be determined based on the first parameter and/or the second parameter of the first image, which may quickly and accurately determine whether the preoperative preparation for endoscopic surgery is well performed and whether the doctor's operating manners are standardized, to ensure the smooth progress of endoscopic surgery. Further, corresponding measures may be taken based on the determination result. For example, when the target image quality is lower than a preset image quality threshold, the endoscopic surgery may be postponed, and the patient may be reminded to make preoperative preparation and/or the doctor's operation may be standardized.

In some embodiments, when the segmented image is a ternary image, the image quality determination module 220 may also determine areas of regions with different colors in the segmented image, and determine the standard of preoperative surgery preparation and/or the standard of doctor's operation based on the area of each region. For example, when the segmented image is a three-value image, a gray region in the segmented image may represent a region of feces, fecal water, bubbles and other impurities in the first image, a white region may represent area region of shadows, highlights, blur and other regions in the first image, and a black region in the segmented image may represent an effective region in the first image. When the target image quality is lower than the preset image quality threshold, the area of white region and gray region in the segmented image may be determined. When the area of the gray region in the segmented image is greater than the preset area threshold, the preoperative preparation for endoscopic surgery may not be perfect. When the area of the white region in the segmented image is greater than the preset area threshold, the doctor's operation may not be standardized.

In some embodiments, the video quality determination module 240 may also determine the target video quality of the target video. The target video quality may refer to a video quality of the target video. Similar to the target image quality, the target video quality of the target video may also be expressed in various ways. For example, the target video quality may be represented by a score from 0 to 100. As another example, the target video quality may also be expressed in grades I to V.

The video quality determination module 240 may obtain a plurality of first images in the target video. In some embodiments, the video quality determination module 240 may determine all video frames in the target video, and determine the plurality of first images based on all video frames. For example, the video quality determination module 240 may obtain a first image corresponding to each video frame in the target video. In some embodiments, the video quality determination module 240 may also extract all video frames in the target video based on a preset frequency (e.g., extract one frame every five frames), obtain a plurality of extracted video frames, and obtain the first images corresponding to the plurality of extracted video frames.

The video quality determination module 240 may determine the target video quality of the target video by a quality assessment model based on the plurality of first images. The quality assessment model may include a machine learning model. The quality assessment model may include a feature extraction layer and a quality assessment layer.

The video quality determination module 240 may process the plurality of first images into a sequence of first images based on an order of each video frame in the plurality of video frames corresponding to the plurality of first images appears in the target video, and input the sequence of first images into the feature extraction layer. The feature extraction layer may extract image features from the plurality of first images to obtain a feature vector sequence. The feature vector sequence may include image features corresponding to the plurality of first images. The feature extraction layer may include a CNN model.

The quality assessment layer may process the feature vector sequence to determine the target video quality. The quality assessment layer may include a deep learning model or any other machine learning model that can achieve above functions.

The video quality determination module 240 may obtain a quality assessment model by training. A quality training sample may include a plurality of sample first images of a sample video, and a quality label may include a sample video quality corresponding to the sample video. The video quality determination module 240 may determine the image quality of each of the plurality of sample first images, and determine the sample video quality corresponding to the sample video based on the image quality corresponding to each sample first image. For example, the image quality corresponding to each of the plurality of sample first images may be averaged, and an average value may be determined as the sample video quality corresponding to the sample video. The video quality determination module 240 may input a quality training sample into an initial quality assessment model, construct a loss function based on an output of the initial quality assessment model and a quality label, and iteratively update parameters of the initial quality assessment model based on the loss function until a preset condition is met, and then the training is completed to obtain the trained quality assessment model. The preset condition may include, but not limited to, the loss function converging, a training period reaching a threshold, or the like.

In some embodiments, the video quality determination module 240 may also determine the target video quality of the target video based on first parameters and/or second parameters of the plurality of first images in the target video.

In some embodiments, the video quality determination module 240 may determine the target image quality of the plurality of first images based on the first parameters and/or second parameters of the plurality of first images corresponding to a plurality of preset target video frames in the target video, calculate an average value of the target image quality of the plurality of first images, and determine the average value of the target image quality as the target video quality. More description about how to determine the target image quality may be found elsewhere in the present disclosure, for example, FIG. 5 and the related descriptions.

In some embodiments, the video quality determination module 240 may also determine a first fusion parameter of the target video based on the first parameters of the plurality of first images; determine a second fusion parameter of the target video based on the second parameters of the plurality of first images; and determine the target video quality of the target video based on the first fusion parameter and the second fusion parameter. More information about the above embodiments may be found elsewhere in the present disclosure, for example, FIG. 7 and the related descriptions.

In some embodiments of the present disclosure, whether the preoperative preparation for endoscopic surgery is well performed and whether the doctor's operating manners are standardized may be quickly and accurately determined by assessing the quality of the target video to ensure the smooth progress of endoscopic surgery.

FIG. 5 is another flowchart illustrating an exemplary process for image quality assessment according to some embodiments of the present disclosure. In some embodiments, process 500 may be performed by the image quality determination module 220. As shown in FIG. 5, the process 500 may include following operations:

In 510, the image quality determination module 220 may determine a first image quality of the target video frame based on the first parameter.

In some embodiments, when the first parameter is the proportion of the effective region in the first image, the image quality determination module 220 may determine the first image quality of the first image based on the proportion of the effective region in the first image. For example, when the first parameter is 92% of the effective region in the first image, the image quality determination module 220 may determine that the first image quality of the first image may be 92 points based on a preset proportion rule. The preset proportion rule may be that a proportion of the effective region in the first image corresponds to a score of the first image quality.

In some embodiments, when the first parameter is parameter information that represents each pixel in the first image as being an effective pixel, the image quality determination module 220 may determine the first image quality of the first image based on the first parameter. For example, if the first parameter is a ratio of effective pixels to all pixels in the first image (e.g., 4:5), the image quality determination module 220 may determine that the first image quality of the first image may be 80 points based on a preset ratio rule. The preset ratio rule may be that a score of the first image quality is a ratio of effective pixels to all pixels multiplied by 100.

In some embodiments, when the first parameter is at least one of the proportion of the at least one effective sub-region in the first image, the count of the at least one effective sub-region, and the positional relationship of the at least one effective sub-region, the image quality determination module 220 may analyze and process at least one of the proportion of the at least one effective sub-region in the first image, the count of the at least one effective sub-region, and the positional relationship of the at least one effective sub-region to determine the first image quality of the first image.

For example, the image quality determination module 220 may determine first score information based on the proportion of the at least one effective sub-region in the first image and a preset region proportion rule. The first score information may be score information that represents a proportion of the at least one effective sub-region in the first image. The preset region proportion rule may include that the first score information is positively related to the proportion of the at least one effective sub-region in the first image, that is, the larger the proportion of the at least one effective sub-region in the first image is, the larger the corresponding first score information may be. The image quality determination module 220 may also determine second score information based on the count of the at least one effective sub-region and a preset region count rule. The second score information is score information that represents the count of the at least one effective sub-region. The preset region count rule may include a negative correlation between the second score information and the count of the at least one effective sub-region, that is, the greater the count of the at least one effective sub-region is, the smaller the corresponding second score information may be. The image quality determination module 220 may also determine third score information based on the positional relationship of the at least one effective sub-region and a preset region position rule. The third score information may be score information that represents a distribution of a position of the at least one effective sub-region. The preset region position rule may include negative correlation between the third score information and a distance between a position of the at least one effective sub-region and a center of the first image, that is, the farther the position of the at least one effective sub-region is from the center of the first image, the smaller the corresponding third score information may be. The image quality determination module 220 may assign different weights to the first score information, the second score information and the third score information based on the actual needs of the user, determine a weighted sum of the first score information, the second score information and the third score information, and determine a result of the weighted sum as the first image quality of the first image.

It should be understood that when the effective sub-regions are scattered in many positions in the first image, even if the proportion of all the effective sub-regions in the first image is relatively large, it is difficult for doctors to accurately obtain more information about an organ captured from a plurality of scattered effective sub-regions, which may affect the quality of endoscopic surgery. In addition, when a position of an effective region in the first image is not in the position of the organ that the doctor needs to capture in the first image, for example, the position that the doctor wants to capture is in the center of the first image, but the effective region is concentrated in the lower right corner of the first image, even if the effective region accounts for a large proportion, the help provided for endoscopic surgery is limited. In some embodiments of the present disclosure, more referential first image quality may be obtained by processing at least one of the proportion of the at least one effective sub-region in the first image, the count of the at least one effective sub-region, and the positional relationship of the at least one effective sub-region, and comprehensively assessing all aspects of the first image, thereby further ensuring the normal operation of endoscopic surgery.

In 520, the image quality determination module 220 may determine a second image quality of the target video frame based on the second parameter of the first image.

In some embodiments, the image quality determination module 220 may determine the second image quality of the target video frame based on the second parameter of the first image. For example, when the second parameter is the structural similarity between the first image and the second image, the image quality determination module 220 may determine the second image quality of the target video frame based on a preset rule. The preset rule may be represented as determining a value of the structural similarity between the first image and the second image multiplying by 100 as a score of the second image quality of the target video frame. For example, the structural similarity between the first image and the second image may be 0.8, and based on the preset rule, the second image quality of the target video frame may be determined as 80 points.

It should be understood that in endoscopic surgery, if the doctor's operation is stable, the conversion between the image frames in the corresponding video obtained via the endoscope may be slow, so a similarity between two adjacent video frames in the video may be high, and the structural similarity between the two adjacent video frames may be high. However, if the doctor operates too fast, the image frames in the video obtained via the endoscope may be converted quickly and shake. The similarity between two adjacent video frames may be low, and the structural similarity between two adjacent video frames may be low. Therefore, whether the doctor's operation is standardized may be assessed based on the structural similarity of adjacent frames.

In 530, the image quality determination module 220 may determine the target image quality of the target video frame based on the first image quality and the second image quality.

In some embodiments, the image quality determination module 220 may process the first image quality and the second image quality in various ways to determine the target image quality of the target video frame. For example, the image quality determination module 220 may determine an average value of the first image quality and the second image quality of the target video frame, and determine the average value as the target image quality of the target video frame. As another example, different weights may be determined for the first image quality and the second image quality in advance based on the actual needs. Then, the first image quality and the second image quality may be weighted and processed, and a weighted and processed result may be determined as the target image quality of the target video frame.

In some embodiments of the present disclosure, the first image quality and the second image quality of the target video frame may be comprehensively assessed, thus to more accurately determine whether the doctor's operation conforms to the operation specifications, and increase the dynamic assessment of the target video frame, thereby making the determined target image quality more comprehensive and accurate.

Figure 6:
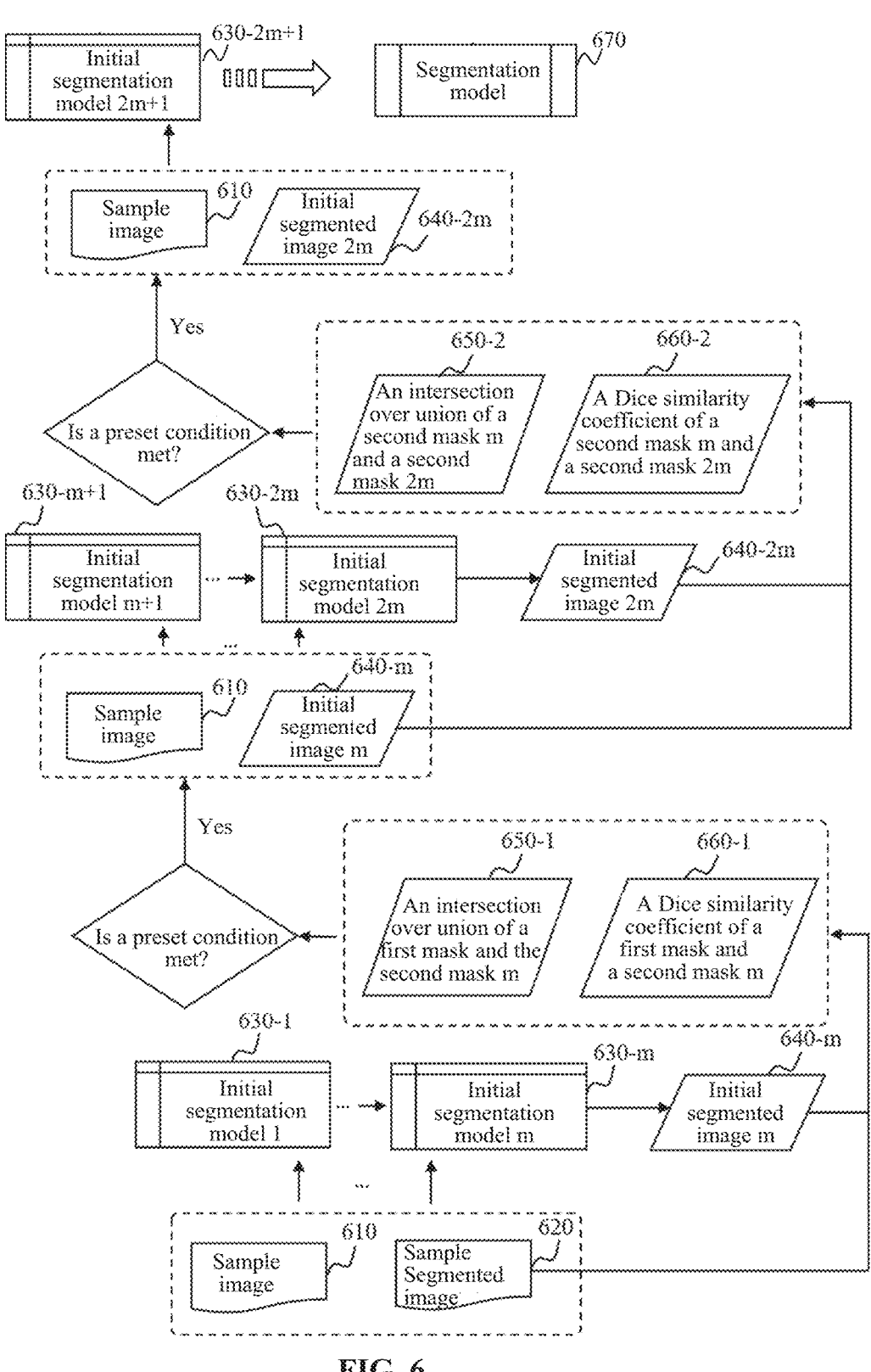
FIG. 6 is a schematic diagram illustrating training an exemplary segmentation model according to some embodiments of the present disclosure.

FIG. 6 is a schematic diagram illustrating training an exemplary segmentation model according to some embodiments of the present disclosure.

In some embodiments, the parameter determination module 230 may obtain a plurality of groups of segmentation training samples. The segmentation training samples may include sample images with segmentation labels, and the segmentation labels may be sample segmented images obtained by marking ineffective regions in the sample images using a first mask. The sample images may be obtained from historical data, and the segmentation labels may be obtained by manually marking the sample images. A region corresponding to the first mask in a sample segmented image may correspond to the ineffective region in a sample image.

In some embodiments, the parameter determination module 230 may obtain a trained segmentation model by performing a plurality of rounds of training on an initial segmentation model based on the plurality of segmentation training samples. After each preset count of rounds of training is performed on the initial segmentation model, for each group of segmentation training samples, the group of segmentation training samples may be inputted into the initial segmentation model that is trained after the preset count of rounds of training to obtain an initial segmented image with a second mask. A second similarity parameter between the first mask and the second mask may be determined. The second similarity parameter may be a parameter to assess a similarity between the first mask and the second mask. The second similarity parameter may be a parameter in variety of forms to assess the similarity between images.

In some embodiments, the second similarity parameter may include an intersection over union (IOU) and a Dice similarity coefficient (DSC). An IOU of the first mask and the second mask may be determined based on the following formula:

$$IOU = \frac{\text{Label} \cap \text{Mask}}{\text{Label} \cup \text{Mask}}, \qquad (7)$$

where IOU represents the IOU of the first mask and the second mask, Label represents the second mask, and Mask represents the first mask. A DSC of the first mask and the second mask may be determined based on the following formula:

$$Dice = \frac{2 \times /\text{Label} \cap \text{Mask}/}{/\text{Label}/ + /\text{Mask}/}, \qquad (8)$$

where Dice represents the DSC of the first mask and the second mask, Label represents the second mask, and Mask represents the first mask.

In some embodiments, the second similarity parameter may also include a coincidence rate between coordinates of edge pixels of the first mask and edge pixels of the second mask. The parameter determination module 230 may obtain the coordinates of the edge pixels of the first mask, and the coordinates of the edge pixels of the second mask respectively, and measure the coincidence rate between the coordinates of edge pixels of the first mask and corresponding coordinates of edge pixels of the second mask. The parameter determination module 230 may determine the second similarity parameter based on a preset rule of the coincidence rate. For example, the preset rule may directly determine the coincidence rate as the second similarity parameter.

In some embodiments, in response to that the second similarity parameter satisfies a preset replacement condition, in a next preset count of rounds of training, the parameter determination module 230 may replace a segmentation label of the group of segmentation training samples with the initial segmented image with the second mask. The initial segmented image may be an output of the initial segmentation model during training. A corresponding region of the second mask in the initial segmented image may correspond to the ineffective region in the sample image. For example, the preset replacement condition may be that the IOU is greater than a preset IOU threshold, and the DSC is greater than a preset DSC threshold. In some embodiments, in response to that the second similarity parameter satisfies the preset replacement condition, in a next preset count of rounds of training, the parameter determination module 230 may train the initial segmentation model based on the segmentation training samples and segmentation labels of the previous round of training.

As shown in FIG. 6, for a group of segmentation training samples, the segmentation training sample may include a sample image 610, and a segmentation label of the segmentation training sample may include a sample segmented image 620. The sample segmented image may include a first mask (not shown in the figure). The initial segmentation model 1 (630-1) may be iteratively trained based on the sample image 610 and the sample segmented image 620. After m rounds of iterative training are performed on the initial segmentation model 1 (630-1), an initial segmentation model m (630-$m$) may be obtained. An output of the initial segmentation model m (630-$m$) may be an initial segmented image m (640-$m$), in which the initial segmented image m includes the second mask m (not shown in the figure). Based on the sample segmented image 620 and the initial segmented image m (640-$m$), the IOU 650-1 of the first mask and the second mask m and the DSC 660-1 of the first mask and the second mask m may be determined. When the IOU 650-1 of the first mask and the second mask m and the DSC 660-1 of the first mask and the second mask m satisfy the preset replacement condition, the initial segmentation model m+1 (630-($m$+1)) may be iteratively trained based on the sample image 610 and the initial segmented image m (640-$m$). After m rounds of iterative training are performed on the initial segmentation model m+1 (630-($m$+1)) again, the initial segmentation model 2$m$ (630-2$m$) may be obtained. An output of the initial segmentation model 2$m$ (630-2$m$) may be the initial segmented image 2$m$ (640-2$m$). The initial segmented image 2$m$ (640-2$m$) may include a second mask 2$m$ (not shown in the figure). Similarly, when the IOU 650-2 of the second mask m and the second mask 2$m$ and the DSC 660-2 of the second mask m and the second mask 2$m$ satisfy the preset replacement condition, the initial segmentation model 2$m$+1 (630-(2$m$+1)) may be iteratively trained based on the sample image 610 and the initial segmented image 2$m$ (640-2$m$). The segmentation label of the segmentation training sample may be updated continuously. The trained segmentation model 670 may be obtained based on the segmentation label of the segmentation training sample and the updated segmentation training sample until a training completion condition is met. The training completion condition may include, but not limited to, a loss function being less than a threshold, the loss function converging, or the count of rounds of training reaching a threshold.

It should be understood that when the segmentation model is trained, the segmentation label of the segmentation training sample may include the manually labeled sample segmentation image with the first mask. Due to the limitation of the recognition ability of eyes, the boundary delimitation of the first mask may be an approximate contour determined by the eyes, resulting in the limitation of the accuracy of the first mask in the sample segmented image.

In some embodiments of the present disclosure, the ability of the initial segmentation model may be continuously improved to recognize ineffective information in the sample image by training the segmentation model. After a preset count of rounds of training is performed on the initial segmentation model, the segmentation label of the segmentation training sample may be updated. The beneficial effects may include correcting an error caused by the manually labeled boundary, thereby improving the accuracy of the trained segmentation model.

FIG. 7 is a flowchart illustrating an exemplary process of determining a target video quality of a target video according to some embodiments of the present disclosure. In some embodiments, process 700 may be performed by the video quality determination module 240. As shown in FIG. 7, the process 700 may include one or more the following operations:

In 710, the video quality determination module 240 may determine a first fusion parameter of the target video based on first parameters of a plurality of first images.

The first fusion parameter may refer to a parameter obtained after comprehensively assessing the first parameters of the plurality of first images in the target video. For example, the first fusion parameter may be an average value (e.g., an arithmetic average value, a logarithmic average value, etc.) of the first parameters of the plurality of first images in the target video. For example, the video quality determination module 240 may determine the average value of the first parameters of the plurality of first images based on the first parameters of preset first images in the target video, and determine the average value as the first fusion parameter of the target video.

In 720, the video quality determination module 240 may determine a second fusion parameter of the target video based on second parameters of the plurality of first images.

The second fusion parameter may refer to a parameter obtained after comprehensively assessing the second parameters of the plurality of first images in the target video. For example, the video quality determination module 240 may determine an average value of the second parameters of the plurality of first images based on the second parameter corresponding to each of the plurality of first images, and determine the average value as the second fusion parameter of the video frames in the target video. The plurality of first images may be the first images corresponding to all or a portion of the video frames. The first parameters may be fused in the same or different ways.

In some embodiments, the video quality determination module 240 may also determine a plurality of first reference images from the plurality of first images based on a preset interval. A first reference image may refer to an image selected from the plurality of first images based on the preset interval. The preset interval may be preset based on the actual needs of the user, or be a default setting of the system.

In some embodiments, for each of the plurality of first reference images, the video quality determination module 240 may designate an image adjacent to the first reference image as a second reference image, and determine a second parameter of the first reference image based on the first reference image and the second reference image. More information of determining the second parameter of the first reference image may be found elsewhere in the present disclosure, for example, FIG. 3 and the related descriptions of determining the second parameter of the first image.

In some embodiments, the video quality determination module 240 may adjust the preset interval between the first reference image and the second reference image based on the second parameter of the first reference image to determine a plurality of updated first reference images. For example, when a current second parameter meets a preset update condition, the preset interval of the plurality of first images between the first reference image and the second reference image may be reduced to obtain the plurality of updated first reference images. When the current second parameter does not meet the preset update condition, the preset interval of the plurality of first images between the first reference image and the second reference image may not be adjusted. The preset update condition may be a condition that needs to extract first images corresponding to more video frames in the target video in advance. For example, the preset update condition may be that the second parameter is less than a parameter threshold (e.g., 0.8). The video quality determination module 240 may adjust the preset interval based on a preset adjustment rule. For example, the preset interval may be reduced by 1 frame per time. The video quality determination module 240 may also determine an adjustment value of the preset interval based on the second parameter of the first reference image according to a preset correspondence. For example, the preset correspondence may include that when the second parameter of the first reference image belongs to a range of [0.6,0.8), the preset interval may decrease by 1 frame per time; when the second parameter of the first reference image belongs to a range of [0.4,0.6), the preset interval may decrease by 3 frames per time.

For example, the preset interval that the video quality determination module 240 previously extract s from the plurality of first images may include extract one first reference image for every five first images When the second parameter between a certain first reference image (e.g., a first image in the first place) and a corresponding second reference image (e.g., a first image in the seventh place) is 0.55, and the preset update condition is met, the video quality determination module 240 may determine, based on the second parameter, an adjusted preset interval as extracting one first reference image for every two first images. Based on the adjusted preset interval, the first image(s) between the first reference image and the corresponding second reference image may be extracted to obtain a plurality of updated first reference images (i.e., the first image in the first place, a first image in the fourth place, and a first image in the seventh place may be used as the updated first reference images).

In some embodiments, for each of the plurality of updated first reference images, the video quality determination module 240 may take an image adjacent to the updated first reference image as an updated second reference image among the plurality of updated first reference images, and determine a second parameter of the updated first reference image based on the updated first reference image and the updated second reference image. More information of determining the second parameter of the updated first reference image may be found elsewhere in the present disclosure, for example, FIG. 3 and the related descriptions of determining the second parameter of the first image.

In some embodiments, the video quality determination module 240 may determine the second fusion parameter of the target video based on second parameters of the plurality of updated first reference images. The video quality determination module 240 may determine an average value (e.g., an arithmetic average value, a logarithmic average value, etc.) of the second parameters of the plurality of updated first reference images, and determine the average value as the second fusion parameter of the target video.

It should be understood that in the process of endoscopic examination or endoscopic surgery, the target video is generally the video of the same part of the patient, and the endoscope may move at an appropriate speed during the capturing process to ensure the clarity of the capturing and the integrity of the captured part, so the target video are continuous video frames of the same part. Therefore, in some embodiments of the present disclosure, the plurality of first reference images may be determined from the plurality of first images at different preset intervals and corresponding second parameters may be determined. When the second parameter of the first reference image meets the preset update condition, the distortion between the first reference image and the second reference image may be high, and the similarity between the first reference image and the second reference image may be low, thus the doctor's operation may be determined to be unstable during this period. Therefore, the video quality determination module 240 may adjust the plurality of first images between the first reference images and the second reference images based on a reduced preset interval to obtain the plurality of updated first reference images, thereby analyzing and processing the video frames corresponding to the first reference image and the second reference image in more detail, and understanding the video quality of this part of content. When the second parameter corresponding to a certain first reference image does not meet the preset update condition, the distortion of the plurality of video frames between the first reference image and the corresponding second reference image may be low, and the similarity between the first reference image and the corresponding second reference image may be large, thus the doctor's operation may be determined to be stable during this period. Therefore, the similarity of the plurality of video frames between the first reference images and the corresponding second reference images may be large, and the video quality determination module 240 does not need to determine the second parameter of each of the plurality of video frames frame by frame, and repeatedly assess the operation stability of the doctor.

By extracting the first reference images and determining the second parameters in some embodiments of the present disclosure, the computational pressure on the processor caused by obtaining each frame in the target video and determining the parameters between each frame and adjacent frames may be avoid, the computational load may be reduced, and the data processing efficiency may be improved. At the same time, by judging the second parameters of the plurality of first reference images to determine whether the preset interval needs to be adjusted to update the first reference images, the accuracy of the assessment may further be ensured.

In 730, the target video quality of the target video may be determined based on the first fusion parameter and/or the second fusion parameter.

The video quality determination module 240 may process the first fusion parameter and/or the second fusion parameter to determine the target video quality of the target video. For example, the video quality determination module 240 may directly determine the first fusion parameter or the second fusion parameter as the target video quality of the target video. As another example, the video quality determination module 240 may directly determine an average value of the first fusion parameter and the second fusion parameter, and determine the average value as the target video quality of the target video. As another example, the video quality determination module 240 may determine a weighted sum of the first fusion parameter and the second fusion parameter. Weights corresponding to the first fusion parameter and the second fusion parameter may be preset based on the actual needs of the user.

In some embodiments of the present disclosure, the target video quality of the target video may be determined based on the first fusion parameter and the second fusion parameter to assess the target video. Based on an overall situation of the target video, whether the preoperative preparation for endoscopic surgery is well performed and whether the doctors' operating manners are standardized may be determined, thus corresponding measures may be taken based on the determination result.

A system for image quality assessment is further provided in the present disclosure. The system may include at least one storage medium, comprising an instruction set for image quality assessment; at least one processor, the at least one processor communicating with the at least one storage medium, wherein when executing the instruction set, the at least one processor may be configured to: obtain a first image of a target video, wherein the first image may be determined based on a target video frame in the target video; and determine a target image quality of the target video frame based on at least one of a first parameter and a second parameter of the first image. The first parameter may be determined based on an effective region in the first image, the second parameter may be determined based on a first similarity parameter between the first image and a second image, and the second image may be determined based on a video frame other than the target video frame in the target video.

In some embodiments, the first parameter may include a proportion of the effective region in the first image.

In some embodiments, the at least one processor may further be configured to: determine the first parameter. To determine the first parameter, the at least one processor may further be configured to: generate a segmented image with a target mask by segmenting, based on a segmentation model, the first image, wherein a region corresponding to the target mask in the segmented image may be an ineffective region in the first image, the segmentation model may include a machine learning model; and determine the first parameter based on the segmented image with the target mask.

In some embodiments, the at least one processor may further be configured to: obtain a plurality of groups of segmentation training samples, wherein the segmentation training samples may include sample images with segmentation labels, the segmentation labels may be sample segmentation images obtained by marking ineffective regions in the sample images using the first mask; obtain a trained segmentation model by performing, based on the plurality of segmentation training samples, a plurality of rounds of training on an initial segmentation model, wherein, after performing each preset count of rounds of training on the initial segmentation model, for each group of the segmentation training samples, obtain an initial segmented image with a second mask by inputting the group of segmentation training samples into the initial segmentation model that is trained after the preset count of rounds of training; determine a second similarity parameter between the first mask and the second mask; and in response to the second similarity parameter satisfies a preset replacement condition, in a next preset count of rounds of training, replace a segmentation label of the group of segmented training samples with the initial segmented image with the second mask.

In some embodiments, in order to determine a target image quality of the target video frame based on a first parameter and/or a second parameter of the first image, the at least one processor may further be configured to: determine a first image quality of the target video frame based on the first parameter; determine a second image quality of the target video frame based on the second parameter of the first image; and determine the target image quality of the target video frame based on the first image quality and the second image quality.

In some embodiments, the target video may be obtained based on an endoscope.

In some embodiments, the at least one processor may further be configured to: determine a target video quality of the target video based on at least one of first parameters and second parameters of a plurality of first images in the target video.

In some embodiments, in order to determine a target video quality of the target video based on at least one of first parameters and second parameters of a plurality of first images in the target video, the at least one processor may further be configured to: determine a first fusion parameter of the target video based on the first parameters of the plurality of first images; determine a second fusion parameter of the target video based on the second parameters of the plurality of first images; and determine the target video quality of the target video based on the first fusion parameter and the second fusion parameter.

A computer-readable storage medium is further provided in the present disclosure. The storage medium may store computer instructions, and after a computer reads the computer instructions in the storage medium, the computer may execute the following method.

The method may include obtaining a first image of a target video, wherein the first image may be determined based on a target video frame in the target video; and determining a target image quality of the target video frame based on at least one of a first parameter and a second parameter of the first image, wherein, the first parameter may be determined based on an effective region in the first image, the second parameter may be determined based on a first similarity parameter between the first image and a second image, and the second image may be determined based on a video frame other than the target video frame in the target video.

Having thus described the basic concepts, it may be rather apparent to those skilled in the art after reading this detailed disclosure that the foregoing detailed disclosure is intended to be presented Merely by way of example and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

28

What is claimed is:

1. A method for image quality assessment, comprising:
obtaining a first image of a target video, wherein the first image is determined based on a target video frame in the target video; and
determining a target image quality of the target video frame based on at least one of a first parameter and a second parameter of the first image, wherein,
the first parameter is determined based on an effective region in the first image by a segmentation model, the segmentation model is a machine learning model, the second parameter is determined based on a first similarity parameter between the first image and a second image, and the second image is determined based on a video frame other than the target video frame in the target video, and the segmentation model is obtained by operations including:
obtaining a plurality of groups of segmentation training samples, wherein the segmentation training samples include sample images with segmentation labels, the segmentation labels being sample segmented images obtained by marking ineffective regions in the sample images using a first mask;
obtaining a trained segmentation model by performing, based on the plurality of groups of segmentation training samples, a plurality of rounds of training on an initial segmentation model, wherein,
after performing each preset count of rounds of training on the initial segmentation model, for each group of the plurality of groups of segmentation training samples, obtaining an initial segmented image with a second mask by inputting the group of segmentation training samples into the initial segmentation model that is trained after the preset count of rounds of training;
determining a second similarity parameter between the first mask and the second mask; and
in response to that the second similarity parameter satisfies a preset replacement condition, in a next preset count of rounds of training, replacing a segmentation label of the group of segmentation training samples with the initial segmented image with the second mask.

2. The method of claim 1, wherein the first parameter includes a proportion of the effective region in the first image.

3. The method of claim 1, wherein the effective region includes at least one effective sub-region, and the first parameter includes at least one of a proportion of the at least one effective sub-region in the first image, a count of the at least one effective sub-region, and a positional relationship of the at least one effective sub-region.

4. The method of claim 1, wherein the video frame other than the target video frame is an adjacent frame of the target video frame.

5. The method of claim 1, further comprising:
determining the first parameter;
wherein the determining the first parameter includes:
obtaining target effective score information corresponding to the first image by processing, based on an effective score model, the first image, wherein the target effective score information represents score information of each pixel in the first image as belonging to the effective region, and the effective score model is a machine learning model; and determining the first parameter based on the target effective score information.

6. The method of claim 1, further comprising:
determining the first parameter;
wherein the determining the first parameter includes:
    generating a segmented image with a target mask by segmenting, based on the segmentation model, the first image, wherein a region corresponding to the target mask in the segmented image is an ineffective region in the first image; and
    determining the first parameter based on the segmented image with the target mask.

7. The method of claim 1, wherein the determining a target image quality of the target video frame based on at least one of a first parameter and a second parameter of the first image includes:
    determining a first image quality of the target video frame based on the first parameter;
    determining a second image quality of the target video frame based on the second parameter of the first image; and
    determining the target image quality of the target video frame based on the first image quality and the second image quality.

8. The method of claim 1, wherein the target video is obtained based on an endoscope.

9. The method of claim 1, further comprising:
determining a target video quality of the target video based on at least one of first parameters and second parameters of a plurality of first images in the target video.

10. The method of claim 9, wherein the determining a target video quality of the target video based on at least one of first parameters and second parameters of a plurality of first images in the target video includes:
    determining a first fusion parameter of the target video based on the first parameters of the plurality of first images;
    determining a second fusion parameter of the target video based on the second parameters of the plurality of first images; and
    determining the target video quality of the target video based on the first fusion parameter and the second fusion parameter.

11. A system for image quality assessment, comprising:
at least one storage medium, comprising an instruction set for image quality assessment;
at least one processor, the at least one processor communicating with the at least one storage medium, wherein when executing the instruction set, the at least one processor is configured to:
    obtain a first image of a target video, wherein the first image is determined based on a target video frame in the target video; and
    determine a target image quality of the target video frame based on at least one of a first parameter and a second parameter of the first image, wherein,
    the first parameter is determined based on an effective region in the first image by a segmentation model, the segmentation model is a machine learning model, the second parameter is determined based on a first similarity parameter between the first image and a second image, and the second image is determined based on a video frame other than the target video frame in the target video, and the segmentation model is obtained by operations including:

obtaining a plurality of groups of segmentation training samples, wherein the segmentation training samples include sample images with segmentation labels, the segmentation labels being sample segmented images obtained by marking ineffective regions in the sample images using a first mask;
obtaining a trained segmentation model by performing, based on the plurality of groups of segmentation training samples, a plurality of rounds of training on an initial segmentation model, wherein,
    after performing each preset count of rounds of training on the initial segmentation model, for each group of the plurality of groups of segmentation training samples, obtaining an initial segmented image with a second mask by inputting the group of segmentation training samples into the initial segmentation model that is trained after the preset count of rounds of training;
    determining a second similarity parameter between the first mask and the second mask; and
    in response to that the second similarity parameter satisfies a preset replacement condition, in a next preset count of rounds of training, replacing a segmentation label of the group of segmentation training samples with the initial segmented image with the second mask.

12. The system of claim 11, wherein the first parameter includes a proportion of the effective region in the first image.

13. The system of claim 11, wherein the at least one processor is further configured to:
determine the first parameter;
to determine the first parameter, the at least one processor is further configured to:
    generate a segmented image with a target mask by segmenting, based on the segmentation model, the first image, wherein a region corresponding to the target mask in the segmented image is an ineffective region in the first image; and
    determine the first parameter based on the segmented image with the target mask.

14. The system of claim 11, wherein, in order to determine a target image quality of the target video frame based on at least one of a first parameter and a second parameter of the first image, the at least one processor is further configured to:
    determine a first image quality of the target video frame based on the first parameter;
    determine a second image quality of the target video frame based on the second parameter of the first image; and
    determine the target image quality of the target video frame based on the first image quality and the second image quality.

15. The system of claim 11, wherein the target video is obtained based on an endoscope.

16. The system of claim 11, wherein the at least one processor is further configured to:
determine a target video quality of the target video based on at least one of first parameters and second parameters of a plurality of first images in the target video.

17. The system of claim 16, wherein, in order to determine a target video quality of the target video based on at least one of first parameters and second parameters of a plurality of first images in the target video, the at least one processor is further configured to:

determine a first fusion parameter of the target video based on the first parameters of the plurality of first images;

determine a second fusion parameter of the target video based on the second parameters of the plurality of first images; and determine the target video quality of the target video based on the first fusion parameter and the second fusion parameter.

18. A non-transitory computer-readable storage medium, wherein the storage medium stores computer instructions, and after the computer reads the computer instructions in the storage medium, the computer executes the following method, comprising:

obtaining a first image of a target video, wherein the first image is determined based on a target video frame in the target video; and determining a target image quality of the target video frame based on at least one of a first parameter and a second parameter of the first image, wherein, the first parameter is determined based on an effective region in the first image by a segmentation model, the segmentation model is a machine learning model, the second parameter is determined based on a first similarity parameter between the first image and a second image, and the second image is determined based on a video frame other than the target video frame in the target video, and the segmentation model is obtained by operations including:

obtaining a plurality of groups of segmentation training samples, wherein the segmentation training samples include sample images with segmentation labels, the segmentation labels being sample segmented images obtained by marking ineffective regions in the sample images using a first mask;

obtaining a trained segmentation model by performing, based on the plurality of groups of segmentation training samples, a plurality of rounds of training on an initial segmentation model, wherein, after performing each preset count of rounds of training on the initial segmentation model, for each group of the plurality of groups of segmentation training samples, obtaining an initial segmented image with a second mask by inputting the group of segmentation training samples into the initial segmentation model that is trained after the preset count of rounds of training;

determining a second similarity parameter between the first mask and the second mask; and in response to that the second similarity parameter satisfies a preset replacement condition, in a next preset count of rounds of training, replacing a segmentation label of the group of segmentation training samples with the initial segmented image with the second mask.

* * * * *